United States Patent
Kim et al.

(10) Patent No.: US 9,215,168 B2
(45) Date of Patent: Dec. 15, 2015

(54) CONTROLLER AREA NETWORK COMMUNICATIONS USING ETHERNET

(71) Applicant: BROADCOM CORPORATION, Irvine, CA (US)

(72) Inventors: Yongbum Kim, Los Altos Hills, CA (US); Mehmet Tazebay, Irvine, CA (US); Kevin Brown, Long Beach, CA (US); Manfred Wagner, Talheim (DE)

(73) Assignee: Broadcom Corporation, Irvine, CA (US)

( * ) Notice: Subject to any disclaimer, the term of this patent is extended or adjusted under 35 U.S.C. 154(b) by 424 days.

(21) Appl. No.: 13/716,521

(22) Filed: Dec. 17, 2012

(65) Prior Publication Data

US 2014/0023068 A1    Jan. 23, 2014

Related U.S. Application Data (60) Provisional application No. 61/674,828, filed on Jul. 23, 2012.

(51) Int. Cl.
*H04L 12/28* (2006.01)
*H04L 12/721* (2013.01)
(Continued)

(52) U.S. Cl.
CPC .......... *H04L 45/72* (2013.01); *H04L 12/40006* (2013.01); *H04L 12/40163* (2013.01); *H04L 12/4625* (2013.01); *H04L 2012/40215* (2013.01)

(58) Field of Classification Search
CPC ............ H04L 29/1232; H04L 29/1233; H04L 61/2092; H04L 61/25; H04L 63/0876
USPC .................................. 370/254, 400; 709/220
See application file for complete search history.

(56) References Cited

U.S. PATENT DOCUMENTS 7,240,364 B1 *  7/2007  Branscomb et al. ............... 726/9
7,672,252 B2 *  3/2010  Fallis et al. .................... 370/252
(Continued)

FOREIGN PATENT DOCUMENTS

EP          1921801 A2    5/2008
KR   10-2011-0057371       6/2011
(Continued)

OTHER PUBLICATIONS

Scharbarg, J.L., et al., "TTCAN over mixed CAN/Switched Ethernet Architecture," 10th IEEE International Conference on Emerging Technologies and Factory Automation, Sep. 2005, pp. 665-668, vol. 1.

(Continued)

*Primary Examiner* — Dang Ton
*Assistant Examiner* — Sai Aung
(74) *Attorney, Agent, or Firm* — McDermott Will & Emery LLP (57) ABSTRACT

Systems and methods for implementing controller area network (CAN) communications between CAN nodes using Ethernet are provided. An Ethernet switch includes ports, each of which is configured to receive an Ethernet data packet (EDP) from a CAN node. Each EDP includes a CAN message, which includes an identification (ID) of a corresponding CAN node. A first port is configured to receive a first EDP and a second port is configured to receive a second EDP. The Ethernet switch also includes a controller module configured to detect a CAN conflict between the first EDP and the second EDP. The controller module is configured to select, in response to the detection of the CAN conflict, the first EDP or the second EDP based on the ID corresponding to the first EDP and the ID corresponding to the second EDP. The controller module is configured to route the selected EDP to a destination.

21 Claims, 4 Drawing Sheets

(51) Int. Cl.
  *H04L 12/46* (2006.01)
  *H04L 12/40* (2006.01)

(56) References Cited

U.S. PATENT DOCUMENTS

| | | | |
|---|---|---|---|
| 2001/0052029 A1* | 12/2001 | Harbin | 709/251 |
| 2004/0042401 A1 | 3/2004 | Itoi | |
| 2004/0258001 A1* | 12/2004 | Remboski et al. | 370/254 |
| 2005/0089059 A1 | 4/2005 | Kurita | |
| 2005/0213560 A1* | 9/2005 | Duvvury | 370/351 |
| 2005/0226169 A1* | 10/2005 | Kelsey et al. | 370/254 |
| 2006/0259204 A1 | 11/2006 | Jordan et al. | |
| 2009/0006585 A1* | 1/2009 | Chen | 709/220 |
| 2010/0135334 A1* | 6/2010 | Briscoe et al. | 370/503 |

FOREIGN PATENT DOCUMENTS

| | | |
|---|---|---|
| TW | 200822634 A | 5/2008 |
| TW | 200824373 A | 6/2008 |

OTHER PUBLICATIONS

Kern, A., et al., "An automated data structure migration concept from CAN to Ethernet/IP in automotive embedded systems (CANoverIP)," Design, Automation and Test in Europe Conference & Exhibit, Mar. 2011, pp. 1-6.

Koopman, P., "CAN Performance: 18-649 Distributed Embedded Systems," Carnegie Mellon, Feb. 2009.

Koopman, P., "Controller Area Network (CAN): Distributed Embedded Systems," Carnegie Mellon, Feb. 2011.

Scharbarg, et al., "CAN-Ethernet Architectures for Real-Time Applications," 10$^{th}$ IEEE International Conference on Emerging Technologies and Factory Automation, Sep. 2005, vol. 2, pp. 245-252.

* cited by examiner

CONTROLLER AREA NETWORK COMMUNICATIONS USING ETHERNET

CROSS-REFERENCES TO RELATED APPLICATIONS

The present application claims the benefit of U.S. Provisional Patent Application Ser. No. 61/674,828, entitled "Ethernet Adaptation Layer Function for CAN Controller," filed on Jul. 23, 2012, which is hereby incorporated by reference in its entirety for all purposes.

FIELD

The subject technology generally relates to network communications and, in particular, relates to implementing Controller Area Network (CAN) communications using Ethernet.

BACKGROUND

A CAN bus uses a vehicle bus standard designed to allow microcontrollers and devices to communicate with each other within a vehicle or other control systems. The CAN bus may use message-based protocols, designed for automotive applications and specific to their functional zones, but may also be used in other areas such as industrial automation and medical equipment.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

A vehicle may have several to as many as 150 or more electronic control units (ECU) for various subsystems. One ECU is the engine control unit (also engine control module (ECM) or Powertrain Control Module (PCM) in automobiles). Other ECUs may be used for transmission, airbags, antilock braking, cruise control, electric power steering, audio systems, windows, doors, mirror adjustment, battery and recharging systems for hybrid/electric cars, etc. Some of these ECUs may form independent subsystems, but communications among others are important. A subsystem may need to control actuators or receive feedback from sensors.

The CAN standard is a multi-master broadcast serial bus standard for connecting different CAN nodes, such as ECUs. The nodes may be connected to the CAN bus (e.g., through a host processor and a CAN controller). Each node may be able to send and receive messages. A message includes data (e.g., up to eight data bytes or more) and an identifier (ID) of a corresponding node, which can be used to represent the priority of the message. A message can be transmitted serially onto the CAN bus. The transmitted signal pattern may be encoded according to a non-return-to-zero (NRZ) line code and may be sensed by all nodes.

If the bus is free, any node may begin to transmit. If two or more nodes begin sending messages at the same time, the message with the more dominant ID (e.g., which has more dominant bits, i.e., zeroes) may override other nodes' less dominant IDs so that eventually, only the message with the most dominant ID remains and is received by all nodes. This mechanism of determining which message to send may be referred to as arbitration (e.g., priority based bus arbitration). For example, messages with numerically lower values of IDs have higher priority, and therefore, may win the arbitration and transmit first.

According to various aspects of the subject technology, CAN communications, including the CAN arbitration process, may be implemented using Ethernet. Ethernet is a familiar standard used by many networked computing devices, and provides, among other things, higher bandwidth, convergence with other network protocols, switching operations, and a well-defined set of fault errors for diagnosing and troubleshooting errors in communications. Thus, CAN protocol compatible communications may be implemented in a faster and more efficient manner using Ethernet.

Figure 1:
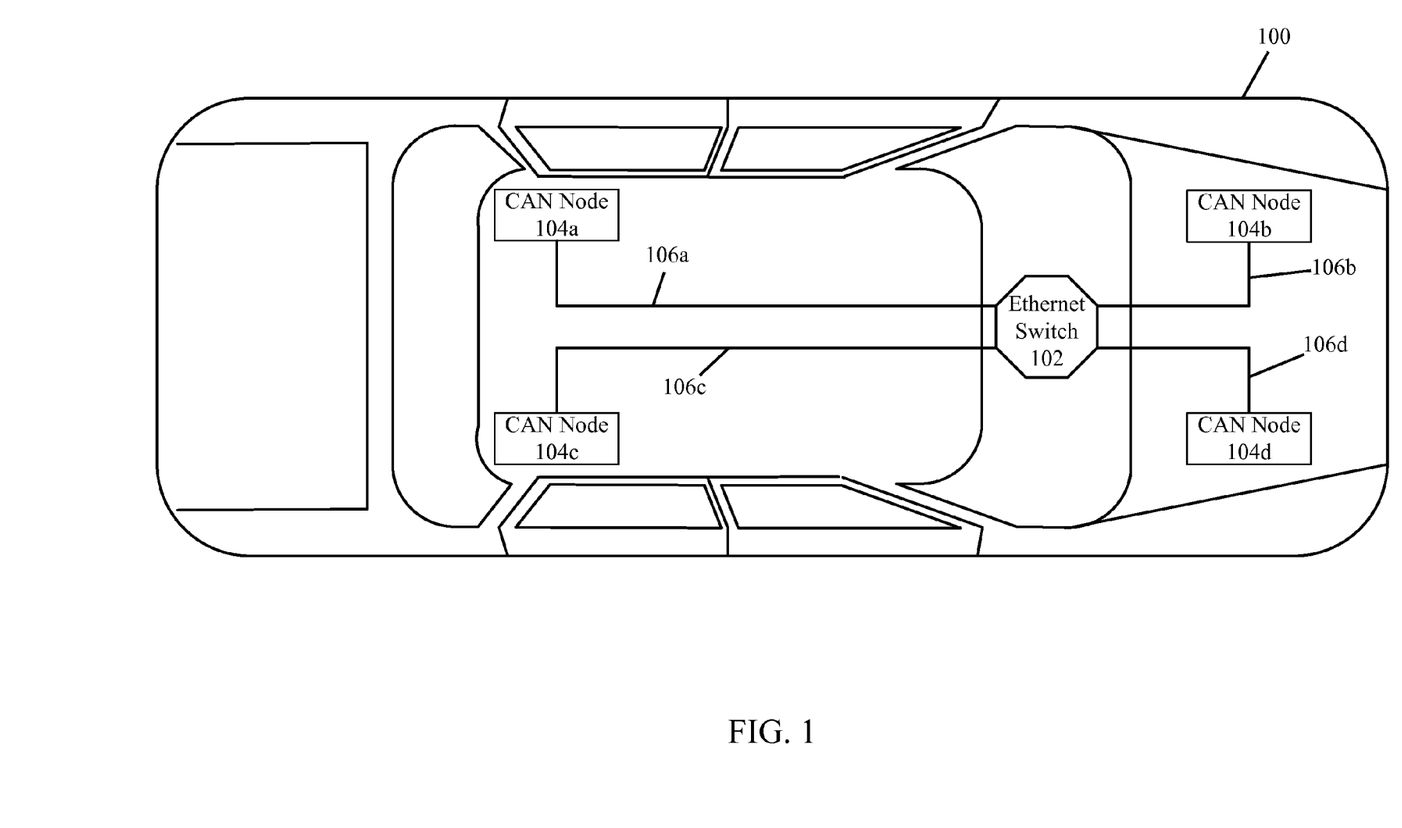
FIG. 1 illustrates an example of a vehicle including an Ethernet switch for implementing CAN communications between CAN nodes over Ethernet links, in accordance with various aspects of the subject technology.

FIG. 1 illustrates an example of vehicle 100 including Ethernet switch 102 for implementing CAN communications between CAN nodes 104a, 104b, 104c, and 104d over Ethernet links 106a, 106b, 106c, and 106d, in accordance with various aspects of the subject technology. In some aspects, CAN nodes 104a, 104b, 104c, and 104d may be ECUs used for engine control, transmission control, airbags, antilock braking, cruise control, electric power steering, audio systems, windows, doors, mirror adjustment, battery and recharging systems for hybrid/electric cars, lighting, power locks, and/or other functions. Although only four CAN nodes are illustrated in FIG. 1, it is understood that CAN communications may be implemented using Ethernet for any number of CAN nodes. It is also understood that multiple CAN buses may be implemented using the same Ethernet bus. It is also understood that multiple Ethernet buses may be implemented, each supporting one or more CAN communications. According to certain aspects, a CAN node having a CAN message to transmit (e.g., CAN node 104a) may include an Ethernet adaptation module that converts the CAN message into an Ethernet data packet. This Ethernet data packet may be received over an Ethernet link (e.g., Ethernet link 106a) by Ethernet switch 102, which may then transmit the Ethernet data packet to one or more receiving CAN nodes (e.g., CAN nodes 104b, 104c, and 104d) over one or more Ethernet links (e.g., Ethernet links 106b, 106c, and 106d). The one or more receiving CAN nodes may each include Ethernet adaptation modules that convert the Ethernet data packet to the original CAN message. According to certain aspects, Ethernet switch 102 may implement a CAN arbitration process to prioritize Ethernet data packets to be routed to the one or more receiving CAN nodes.

Figure 2:
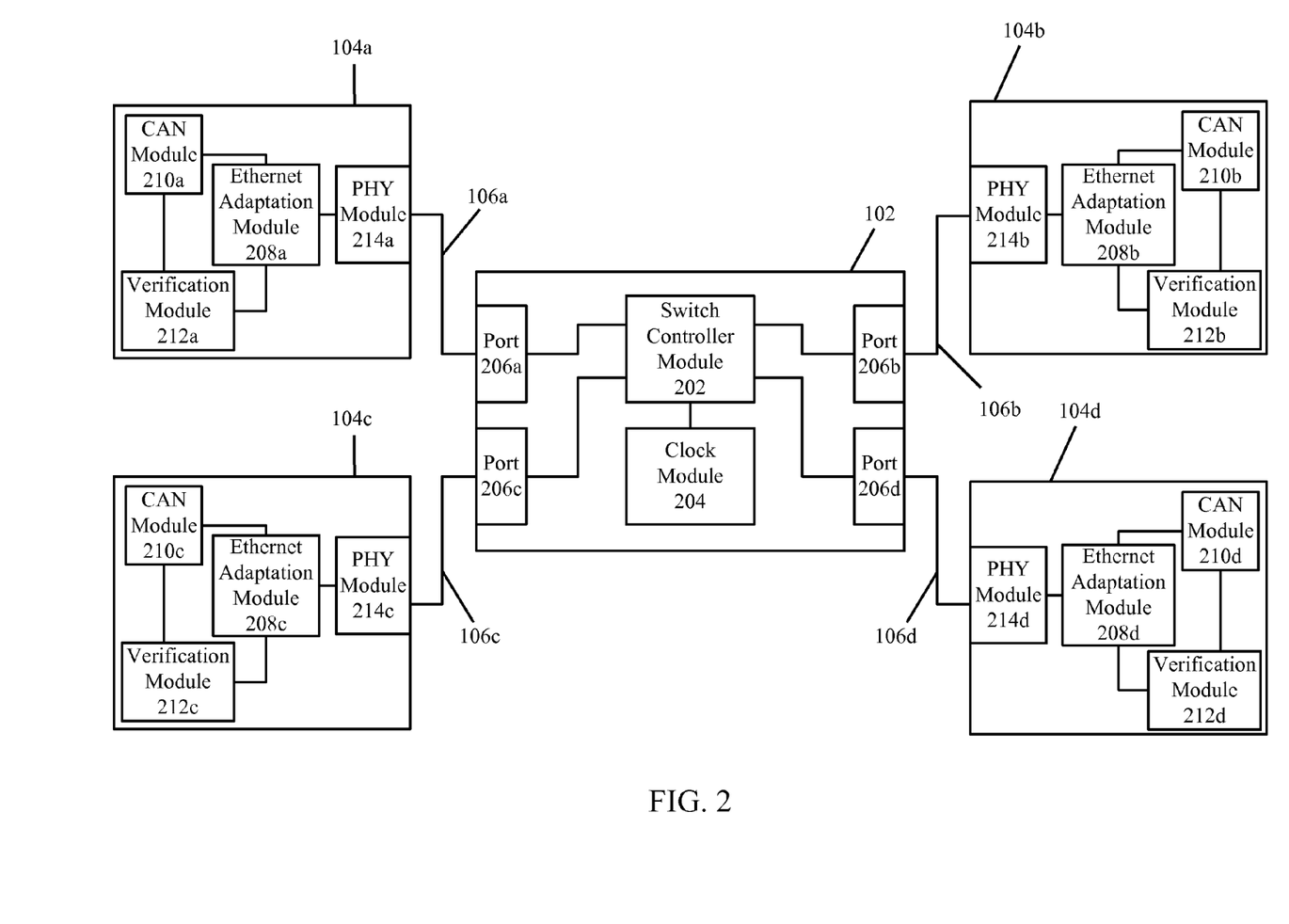
FIG. 2 is a block diagram illustrating components of an Ethernet switch 102 and CAN nodes, in accordance with various aspects of the subject technology.

FIG. 2 is a block diagram illustrating components of Ethernet switch 102 and CAN nodes 104a, 104b, 104c, and 104d, in accordance with various aspects of the subject technology. Ethernet switch 102 includes ports 206a, 206b, 206c, and 206d, switch controller module 202, and clock module 204, which are in communication with one another. CAN node 104a includes Ethernet adaptation module 208a, CAN module 210a, verification module 212a, and physical layer (PHY) module 214a, which are in communication with one another. Similarly, CAN node 104b includes Ethernet adaptation module 208b, CAN module 210b, verification module 212b, and PHY module 214b. CAN node 104c includes Ethernet adaptation module 208c, CAN module 210c, verification module 212c, and PHY module 214c. CAN node 104d includes Ethernet adaptation module 208d, CAN module 210d, verification module 212d, and PHY module 214d. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

According to certain aspects, a CAN module (e.g., CAN modules 210a, 210b, 210c, or 210d) includes logic, circuitry, and/or code for generating CAN messages. In one or more implementations, the CAN module includes a CAN controller. Each CAN message includes data and an identification (ID) of a corresponding CAN node. For example, CAN module 210a may generate a CAN message that includes data and an ID of CAN node 104a. An Ethernet adaptation module (e.g., Ethernet adaptation modules 208a, 208b, 208c, or 208d) includes logic, circuitry, and/or code for generating an Ethernet data packet based on a CAN message received from a corresponding CAN module. According to certain aspects, an Ethernet adaptation module may encapsulate a CAN message as an Ethernet data packet, thereby allowing the CAN message to be transmitted over an Ethernet link. A PHY module (e.g., PHY modules 214a, 214b, 214c, or 214d) includes logic, circuitry, interfaces, and/or code for supporting communications with other network equipment. According to certain aspects, a PHY module may include a transceiver (e.g., a receiver and transmitter), a scrambler, a descrambler, one or more digital signal processing blocks, and/or other components for supporting communications with other network equipment. The PHY module may receive the Ethernet data packet from the Ethernet adaptation module and provide the Ethernet data packet to Ethernet switch 102 over an Ethernet link (e.g., Ethernet links 106a, 106b, 106c, and 106d).

According to various aspects of the subject technology, Ethernet switch 102 includes ports 206a, 206b, 206c, and 206d, each of which is configured to receive an Ethernet data packet from a respective CAN node (e.g., port 206a receives an Ethernet data packet from PHY module 214a of CAN node 104a over Ethernet link 106a, port 206b receives an Ethernet data packet from PHY module 214b of CAN node 104b over Ethernet link 106b, port 206c receives an Ethernet data packet from PHY module 214c of CAN node 104c over Ethernet link 106c, and port 206d receives an Ethernet data packet from PHY module 214d of CAN node 104d over Ethernet link 106d). A port (e.g., ports 206a, 206b, 206c, or 206d) may provide a received Ethernet data packet to switch controller module 202, which includes logic, circuitry, and/or code for supporting communications with other network equipment. According to certain aspects, switch controller module 202 and/or a port (e.g., port 206a, 206b, 206c, or 206d) may include a transceiver (e.g., a receiver and transmitter), a scrambler, a descrambler, one or more digital signal processing blocks, and/or other components for supporting communications with other network equipment. In some aspects, switch controller module 202 is configured to route an Ethernet data packet to a destination via a corresponding port.

According to certain aspects, clock module 204 includes logic, circuitry, and/or code for enabling switch controller module 202 to transmit and receive data packets according to timing cycles. A CAN message may include information regarding a desired time to transmit the CAN message and/or a time that the CAN message can be delivered to its intended destination before it is considered an error. In this regard, switch controller module 202 may extract this timing information, and clock module 204 may determine an acceptable time (e.g., a transmit clock) to transmit the Ethernet data packet to its intended destination. Clock module 204 may determine the transmit clock using a primary reference clock that it may either generate (e.g., from a free-running crystal oscillator) or receive from another network component (e.g., another switch). Switch controller module 202 may transmit an Ethernet data packet according to a corresponding transmit clock generated by clock module 204. According to certain aspects, switch controller module 202 and/or clock module 204 may generate a CAN reference clock from an Ethernet network clock derived from and/or synchronized with the timing among the CAN nodes and/or other switches using the Institute of Electrical and Electronics Engineers (IEEE) 802.1AS standard, the IEEE 1588 standard, and/or other standards.

A PHY module (e.g., PHY modules 214a, 214b, 214c, or 214d) may also receive an Ethernet data packet from Ethernet switch 102. The Ethernet adaptation module (e.g., Ethernet adaptation modules 208a, 208b, 208c, or 208d) may extract the CAN message from the Ethernet data packet and provide the CAN message to the CAN module (e.g., CAN module 210a, 210b, 210c, or 210d).

According to certain aspects, a CAN node (e.g., CAN node 104a, 104b, 104c, or 104d) may take part in the CAN arbitration process, such as by determining whether transmission of an Ethernet data packet was successful (and therefore does not need to be retransmitted) or unsuccessful (and therefore needs to be retransmitted, such as in a situation where another Ethernet data packet with a more dominant ID was transmitted instead). The CAN node may transmit an original Ethernet data packet (including a CAN message having a particular ID of the transmitting CAN node). The CAN node may determine if such a transmission was successful by using a verification module (e.g., verification module 212a, 212b, 212c, or 212d). According to certain aspects, the corresponding PHY module that transmitted the original Ethernet data packet over an Ethernet link may detect an observed Ethernet data packet on the Ethernet link. The corresponding Ethernet adaptation module may extract the CAN message from the observed Ethernet data packet. The verification module may compare the ID from this CAN message to the particular ID of the transmitting CAN node. If these IDs match, then the verification module determines that transmission of the original Ethernet data packet was successful. Otherwise, the verification module determines that transmission of the original Ethernet data packet was unsuccessful (e.g., because the observed Ethernet data packet had a more dominant ID and was transmitted over the Ethernet link instead).

Figure 3:
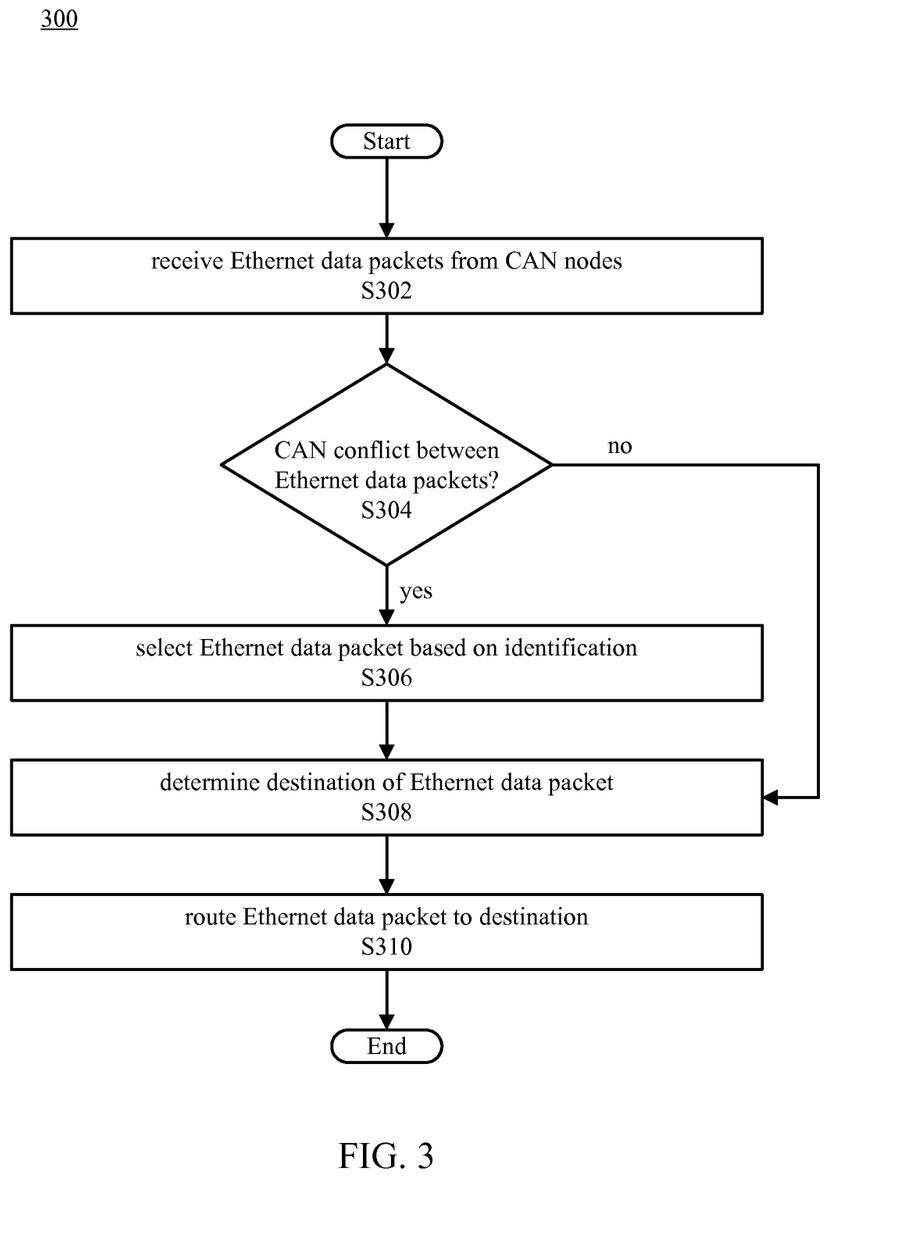
FIG. 3 illustrates an example of a method for implementing CAN communications between CAN nodes over Ethernet links, in accordance with various aspects of the subject technology.

FIG. 3 illustrates an example of method 300 for implementing CAN communications between CAN nodes 104a, 104b, 104c, and 104d over Ethernet links 106a, 106b, 106c, and 106d, in accordance with various aspects of the subject technology. Ethernet switch 102, for example, may be used to implement method 300. However, method 300 may also be implemented by systems having other configurations. Although method 300 is described herein with reference to the examples of FIGS. 1, 2 and 4, method 300 is not limited to these examples. Furthermore, method 300 does not necessarily need to be performed in the order as shown. Based upon design preferences, it is understood that the order of method 300 may be rearranged.

Assume, for the purposes of illustration, that CAN node 104a intends to transmit a first Ethernet data packet (including a first CAN message that includes a first ID of CAN node 104a) to CAN node 104b. Furthermore, assume that CAN node 104c intends to transmit a second Ethernet data packet (including a second CAN message that includes a second ID of CAN node 104c) to CAN node 104d. CAN nodes 104a and 104c may transmit the first Ethernet data packet and the second Ethernet data packet, respectively, to Ethernet switch 102, which receives these packets via ports 206a and 206c, respectively (S302).

According to certain aspects, switch controller module 202 is configured to detect a CAN conflict between the first Ethernet data packet and the second Ethernet data packet (S304). That is, switch controller module 202 can detect if there is more than one Ethernet data packet to transmit at Ethernet switch 102 (e.g., the first Ethernet data packet and the second Ethernet data packet were received at the same time). If switch controller module 202 does not detect the CAN conflict (e.g., only a single Ethernet data packet is available at Ethernet switch 102 for transmission), switch controller module 202 may proceed with determining a destination of the single Ethernet data packet that was received (S308). However, if switch controller module 202 detects the CAN conflict (e.g., more than one Ethernet data packets were received), Ethernet switch 102 may implement an arbitration process to prioritize a transmission order of the received Ethernet data packets. For example, switch controller module 202 selects either the first Ethernet data packet or the second Ethernet data packet for transmission based on the first ID and the second ID (S306). Switch controller module 202 may emulate the CAN arbitration process by prioritizing Ethernet data packets that are associated with lower IDs (e.g., an ID of "000 0000" may have the highest priority while an ID of "111 1111" may have the lowest priority). Assume, for the purposes of illustration that the ID of CAN node 104a is less than the ID of CAN node 104c. Thus, switch controller module 202 may select the first Ethernet data packet (from CAN node 104a) for transmission. In this regard, the second Ethernet data packet may be transmitted in a next transmission cycle.

According to certain aspects, switch controller module 202 determines a destination of the selected Ethernet data packet (e.g., if a CAN conflict was detected) or of the single Ethernet data packet available at Ethernet switch 102 for transmission (e.g., if a CAN conflict was not detected) (S308). Assume, for the purposes of illustration, that the first Ethernet data packet is the selected Ethernet data packet for transmission. According to certain aspects, the first CAN message from the first Ethernet data packet may include information regarding its intended destination. In this situation, switch controller module 202 may determine the destination of the first Ethernet data packet by extracting the intended destination information from the first CAN message. In some aspects, the destination may be predetermined. For example, one or more nodes (e.g., CAN node 104b, 104c, and/or 104d) may be predetermined to receive all data packets originating from CAN node 104a. This predetermined destination may be provided to and/or stored in Ethernet switch 102. In this regard, switch controller module 202 may determine the destination of the first Ethernet data packet by looking up the predetermined destination.

According to certain aspects, switch controller module 202 routes the Ethernet data packet (e.g., the selected Ethernet data packet if a CAN conflict was detected or the single Ethernet data packet available at Ethernet switch 102 for transmission if a CAN conflict was not detected) to the determined destination via one or more corresponding ports (S310). Assuming that the first Ethernet data packet is the selected Ethernet data packet, and the destination is determined to be CAN node 104b, switch controller module 202 may route the first Ethernet data packet to CAN node 104b via port 206b.

According to certain aspects, the bandwidth of Ethernet communications may be greater than the bandwidth typically supported by CAN nodes. Thus, each transmitting CAN node's maximum bandwidth may be provisioned, thereby rendering CAN communications using Ethernet more efficient than CAN communications without using Ethernet. In one or more implementations, if a CAN node (e.g., CAN node 104a, 104b, 104c, or 104d) transmits at 125 kilobits per second (kbps) and Ethernet switch 102 operates at a bandwidth of 10 megabits per second (mbps) with full duplex, up to 40 CAN nodes can transmit without arbitration loss (e.g., an Ethernet data packet does not have to wait for another Ethernet data packet with a more dominant ID to be transmitted). Thus, assuming Ethernet data packets do not have the same destination, multiple CAN nodes can transmit the Ethernet data packets without arbitration loss. As discussed above, the intended destination of the first Ethernet data packet is CAN node 104b, while the intended destination of the second Ethernet data packet is CAN node 104d. According to certain aspects, switch controller module 202 may route the first Ethernet data packet to CAN node 104b and the second Ethernet data packet to CAN node 104d at the same time without arbitration loss.

In some aspects, Ethernet switch 102 may implement the CAN communications at a set bandwidth. In one or more implementations, if a network of CAN nodes is required to operate at 125 kbps, Ethernet switch 102 may route the selected Ethernet data packet to the destination at the set bandwidth (e.g., 125 kbps) rather than at its maximum bandwidth (e.g., 10 mbps). In some aspects, switch controller module 202 is configured to route an Ethernet data packet to its destination at a bandwidth supported by the destination. Although Ethernet switch 102 is described as being operable at a bandwidth of 10 mbps, Ethernet switch 102 may operate at any Ethernet bandwidth (e.g., 100 mbps, 250 mbps, 1000 mbps, 2500 mbps, etc.). Although each transmitting CAN node is described as being operable at a bandwidth of 125 kbps, each transmitting CAN node may operate at any bandwidth (e.g., less than the Ethernet bandwidth).

According to various aspects of the subject technology, CAN bus status signaling such as CAN error messages may be propagated using Ethernet. Switch controller module 202 may detect a CAN message error (e.g., an excessive cyclic redundancy check error, a local CAN address not-reachable and/or not-listened-to error, etc.), and generate a corresponding Ethernet fault message based on the detected CAN message error. Switch controller module 202 may route the generated Ethernet fault message to the CAN node to which the error is applicable. The Ethernet adaptation module of this CAN node may receive the Ethernet fault message (via the corresponding PHY module), generate the corresponding CAN message error based on the received Ethernet fault message, and provide the CAN message error to the corresponding CAN module. In some aspects, the Ethernet adaptation module may also report cable faults (e.g., short, open, improper transmission line, etc.) to the CAN module.

Although the CAN communications are described above as being implemented using Ethernet switch 102, the CAN communications may also be implemented using a shared Ethernet bus operation (e.g., CAN nodes 104a, 104b, 104c, and 104d may transmit directly over a shared Ethernet link). A shared Ethernet bus operation may include the IEEE 802.3 Carrier-Sense, Multiple Access/Collision Detection (CSMA/CD) method, the master-slave timeslot access IEEE 802.3 Ethernet PON method, or variants thereof. In a shared Ethernet bus operation, each CAN node may transmit and receive Ethernet data packets as described above, except that the transmission and receipt of the Ethernet data packets are over a single Ethernet link. Thus, all CAN nodes may listen to the transmissions occurring over the Ethernet link. Furthermore, the Ethernet adaptation module of each CAN node may implement the arbitration process as described above to determine whether transmission of an Ethernet data packet over the Ethernet link was successful or unsuccessful.

Figure 4:
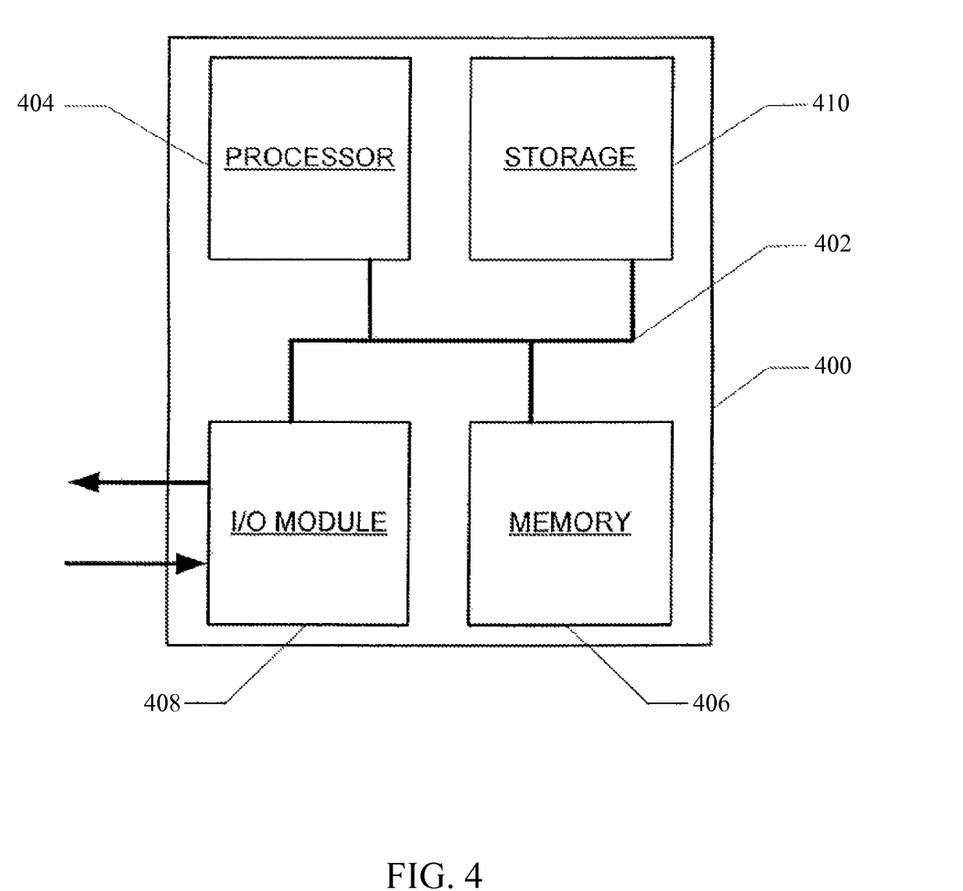
FIG. 4 is a block diagram illustrating components of a controller, in accordance with various aspects of the subject technology.

FIG. 4 is a block diagram illustrating components of controller 400, in accordance with various aspects of the subject technology. Controller 400 comprises processor module 404, storage module 410, input/output (I/O) module 408, memory module 406, and bus 402. Bus 402 may be any suitable communication mechanism for communicating information. Processor module 404, storage module 410, I/O module 408, and memory module 406 are coupled with bus 402 for communicating information between any of the modules of controller 400 and/or information between any module of controller 400 and a device external to controller 400. For example, information communicated between any of the modules of controller 400 may include instructions and/or data. In some aspects, bus 402 may be a universal serial bus. In some aspects, bus 402 may provide Ethernet connectivity.

In some aspects, processor module 404 may comprise one or more processors, where each processor may perform different functions or execute different instructions and/or processes. For example, one or more processors may execute instructions for implementing CAN communications using Ethernet, and one or more processors may execute instructions for input/output functions.

Memory module 406 may be random access memory ("RAM") or other dynamic storage devices for storing information and instructions to be executed by processor module 404. Memory module 406 may also be used for storing temporary variables or other intermediate information during execution of instructions by processor 404. In some aspects, memory module 406 may comprise battery-powered static RAM, which stores information without requiring power to maintain the stored information. Storage module 410 may be a magnetic disk or optical disk and may also store information and instructions. In some aspects, storage module 410 may comprise hard disk storage or electronic memory storage (e.g., flash memory). In some aspects, memory module 406 and storage module 410 are both a machine-readable medium.

Controller 400 may be coupled via I/O module 408 to a system control and management system (e.g., a vehicle central gateway) and/or a user interface, which may allow a user to communicate information and select commands to controller 400 as well as receive information from controller 400. For example, a vehicle central gateway may provision bandwidth, log fault diagnostics, reset and recover actions, and log statistics. The user interface may be a monitor (e.g., liquid crystal display (LCD), a light emitting diode (LED) display, an organic light emitting diode (OLED) display, a flexible display, a flat panel display, a solid state display) for displaying information to a user. The user interface may also include, for example, a keyboard, a mouse, or any device with sensory feedback, visual feedback, auditory feedback, and/or tactile feedback coupled to controller 400 via I/O module 408 for communicating information and command selections to processor module 404.

According to various aspects of the subject technology, methods described herein may be executed by controller 400. In one or more implementations, processor module 404 executes one or more sequences of instructions contained in memory module 406 and/or storage module 410. In some aspects, instructions may be read into memory module 406 from another machine-readable medium, such as storage module 410. In some aspects, instructions may be read directly into memory module 406 from I/O module 408, for example from a user via the user interface. Execution of the sequences of instructions contained in memory module 406 and/or storage module 410 may cause processor module 404 to perform methods to implement CAN communications using Ethernet. In one or more implementations, a computational algorithm for implementing CAN communications using Ethernet may be stored in memory module 406 and/or storage module 410 as one or more sequences of instructions. Information such as an Ethernet data packet, a CAN message, a selection of an Ethernet data packet, a destination, timing information, a CAN message error, an Ethernet fault message, and/or other information may be communicated from processor module 404 to memory module 406 and/or storage module 410 via bus 402 for storage. In some aspects, the information may be communicated from processor module 404, memory module 406, and/or storage module 410 to I/O module 408 via bus 402. The information may then be communicated from I/O module 408 to a user via the user interface.

One or more processors in a multi-processing arrangement may also be employed to execute the sequences of instructions contained in memory module 406 and/or storage module 410. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 404 for execution. Such a medium may take many forms, including, but not limited to, non-volatile media and volatile media. Non-volatile media include, for example, optical or magnetic disks, such as storage module 410. Volatile media include dynamic memory, such as memory module 406. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An Ethernet switch for implementing controller area network (CAN) communications between a plurality of CAN nodes, the Ethernet switch comprising:
 a plurality of ports each of which is configured to receive an Ethernet data packet from a respective CAN node, each Ethernet data packet comprising a CAN message, each CAN message comprising an identification (ID) of a corresponding CAN node, the ID indicating a priority associated with the corresponding CAN node; and
 a controller circuit configured to detect a CAN timing conflict between a first Ethernet data packet received at a first one of the plurality of ports at a same time as a second Ethernet data packet received at a second one of the plurality of ports, wherein the controller circuit is configured to select, in response to the detection of the CAN conflict, the first Ethernet data packet or the second Ethernet data packet based on the ID corresponding to the first Ethernet data packet and the ID corresponding to the second Ethernet data packet, and wherein the controller circuit is further configured to route the selected Ethernet data packet to a destination without routing the first or second Ethernet data packet that is not selected to a destination.

2. The Ethernet switch of claim 1, wherein each of the plurality of CAN nodes comprises a CAN controller and an Ethernet adaptation circuit.

3. The Ethernet switch of claim 2, wherein the Ethernet adaptation circuit of each of the plurality of CAN nodes encapsulates CAN messages in Ethernet packets.

4. The Ethernet switch of claim 1, wherein the selected Ethernet data packet is the first Ethernet data packet, and wherein the ID corresponding to the first Ethernet data packet is less than the ID corresponding to the second Ethernet data packet.

5. The Ethernet switch of claim 4, wherein the controller circuit is further configured to route the second Ethernet data packet on a transmission cycle after the first Ethernet data packet is routed.

6. The Ethernet switch of claim 1, wherein the controller circuit is further configured to determine the destination of the selected Ethernet data packet.

7. The Ethernet switch of claim 6, wherein the destination comprises a) a single one of the plurality of CAN nodes excluding the CAN node corresponding to the port that received the selected Ethernet data packet, b) two or more of the plurality of CAN nodes excluding the CAN node corresponding to the port that received the selected Ethernet data packet, or c) all of the plurality of CAN nodes excluding the CAN node corresponding to the port that received the selected Ethernet data packet.

8. The Ethernet switch of claim 1, further comprising a clock circuit coupled to the controller circuit, wherein the clock circuit is configured to generate a transmit clock, and wherein the controller circuit is configured to route the selected Ethernet data packet based on the transmit clock.

9. The Ethernet switch of claim 8, wherein the clock circuit is configured to receive a primary reference clock and to generate the transmit clock based on the primary reference clock.

10. The Ethernet switch of claim 1, wherein the controller circuit is configured to route the selected Ethernet data packet to the destination at a bandwidth supported by the destination.

11. The Ethernet switch of claim 1, wherein the controller circuit is configured to detect a CAN message error and to transmit an Ethernet fault message to one or more of the plurality of CAN nodes based on the detection of the CAN message error.

12. A controller area network (CAN) node for implementing CAN communications using Ethernet, the CAN node comprising:

a CAN circuit configured to generate a first CAN message, the first CAN message comprising a first identification (ID) of the CAN node, the ID being indicative of a priority associated with the CAN node;

an Ethernet adaptation circuit configured to generate a first Ethernet data packet based on the first CAN message and to provide the first Ethernet data packet to a transceiver for transmitting the first Ethernet data packet to a destination over an Ethernet link, wherein the Ethernet adaptation circuit is further configured to receive a second Ethernet data packet from the transceiver, the second Ethernet data packet being detected by the transceiver over the Ethernet link, the second Ethernet data packet comprising a second CAN message, the second CAN message comprising a second ID, and wherein the Ethernet adaptation circuit is further configured to extract the second CAN message from the second Ethernet data packet; and a verification circuit configured to compare the first ID to the second ID and to determine that transmission of the first Ethernet data packet was successful when the the first ID matches the second ID.

13. The CAN node of claim 12, wherein the Ethernet adaptation circuit is configured to encapsulate the first CAN message as the first Ethernet data packet.

14. The CAN node of claim 12, further comprising the transceiver, wherein the transceiver is configured to transmit the first Ethernet data packet to the destination, wherein the first CAN message comprises transmission time information for transmitting the first CAN message, and wherein the transceiver is configured to transmit the first Ethernet data packet according to the transmission time information.

15. The CAN node of claim 12, wherein the Ethernet adaptation circuit is configured to detect an Ethernet fault message and provide a CAN message error to the CAN circuit based on the detection of the Ethernet fault message.

16. The CAN node of claim 12, wherein the Ethernet link comprises a shared Ethernet bus.

17. A method for implementing controller area network (CAN) communications between a plurality of CAN nodes using Ethernet, the method comprising:

receiving a first Ethernet data packet from a first CAN node of the plurality of CAN nodes, the first Ethernet data packet comprising a first CAN message, the first CAN message comprising a first identification (ID) of the first CAN node, and the first ID being indicative of a first priority associated with the first CAN node;

receiving a second Ethernet data packet from a second CAN node of the plurality of CAN nodes, the second Ethernet data packet comprising a second CAN message, the second CAN message comprising a second ID of the second CAN node, and the second ID being indicative of a second priority associated with the second CAN node;

detecting a timing conflict between the first Ethernet data packet and the second Ethernet data packet;

selecting, in response to the detection of the timing conflict, the first Ethernet data packet or the second Ethernet data packet based on the first priority indicated by the first ID and the second priority indicated by the second ID;

determining a destination of the selected Ethernet data packet; and routing the selected Ethernet data packet to the destination.

18. The method of claim 17, wherein the selected Ethernet data packet is the first Ethernet data packet, wherein the destination is a first target location comprising a set of the plurality of CAN nodes, and wherein the method further comprises determining a second target location of the second Ethernet data packet, the second target location comprising at least one of the plurality of CAN nodes excluding the set of the plurality of CAN nodes.

19. The method of claim 18, further comprising routing the first Ethernet data packet to the first target location and the second Ethernet data packet to the second target location at the same time.

20. The method of claim 17, wherein the selected Ethernet data packet is routed to the destination over an Ethernet link, the Ethernet link comprising a shared Ethernet bus.

21. The method of claim 17, wherein the first ID is assigned exclusively to the first CAN node of the plurality of CAN nodes and the second ID is assigned exclusively to the second CAN node of the plurality of CAN nodes.

* * * * *